June 8, 1965     F. R. VAN VLEET     3,188,095
FLUID SEAL WITH PRESSURE RESPONSIVE COMPENSATING MEANS
Filed July 20, 1961

*INVENTOR.*
FRANK R. VAN VLEET
BY
ATTORNEYS

United States Patent Office 3,188,095
Patented June 8, 1965

3,188,095
FLUID SEAL WITH PRESSURE RESPONSIVE COMPENSATING MEANS
Frank R. Van Vleet, North Reading, Mass., assignor to A. W. Chesterton Company, Everett, Mass., a corporation of Massachusetts
Filed July 20, 1961, Ser. No. 125,512
7 Claims. (Cl. 277—27)

This invention comprises a new and improved fluid seal for a shaft rotating in a stationary stuffing box or gland. The principal object of the invention is to relieve the axially movable elements of the seal from all mechanical interference or hindrance to their designed fluid pressure action under conditions of rotation.

In such seals as heretofore constructed fluid pressure has been transmitted through an active and movable or dynamic O-ring interposed between a stationary wall of the stuffing box and an axially movable element of the seal and it has sometimes happened that the ring has imparted a mechanical drag in one direction or the other to the movable element which has increased or decreased the desired and delicately balanced movement of the element under fluid pressure alone. I have discovered that this difficulty may be obviated by providing an intermediate axially stationary element between the shaft and the walls of the stuffing box so that the dynamic O-ring is engaged between axially stationary surfaces and can have no direct effect on the elements movable under fluid pressure. This movable and pressure transmitting O-ring is herein termed a dynamic O-ring.

As herein shown and in accordance with an important feature of the invention the intermediate member takes the form of a flanged disk having an elongated tubular stem concentrically surrounding the axially movable element of the seal, and is held stationary by fitting its flange into a recess in the gland of the stuffing box. The dynamic O-ring may thus be located between a stationary concave surface of the gland and the stationary convex surface of the flanged intermediate member. The longitudinally movable member of the seal is thus left free to move axially under fluid pressure alone within the bore of the intermediate member.

Another important feature of the invention resides in an improved construction of the rotary elements of the seal, such that a square or accurately radial contact face is secured for engagement with the non-rotating elements of the seal. To this end the shaft is provided with a two-part ring having an inturned flange at one end interlocked with an integral ring provided with an out-turned flange and presenting an accurately lapped end contact face. An advantage of this construction is that the two-part ring may be clamped to the shaft without danger of distortion while the integral ring is relieved of all clamping strains that might otherwise disturb the accuracy of its end contact face.

These and other features of the invention will be best understood and appreciated from the following description of a preferred embodiment thereof, selected for purposes of illustration and shown in the accompanying drawings, in which.

Figure 1:
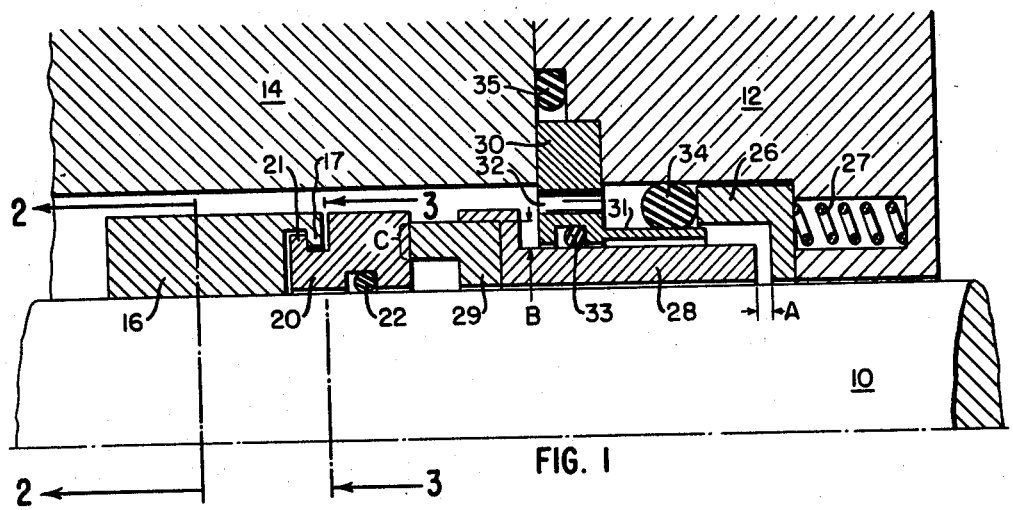
FIG. 1 is a half longitudinal section taken on the axis of the shaft.
Figures 2, 3:
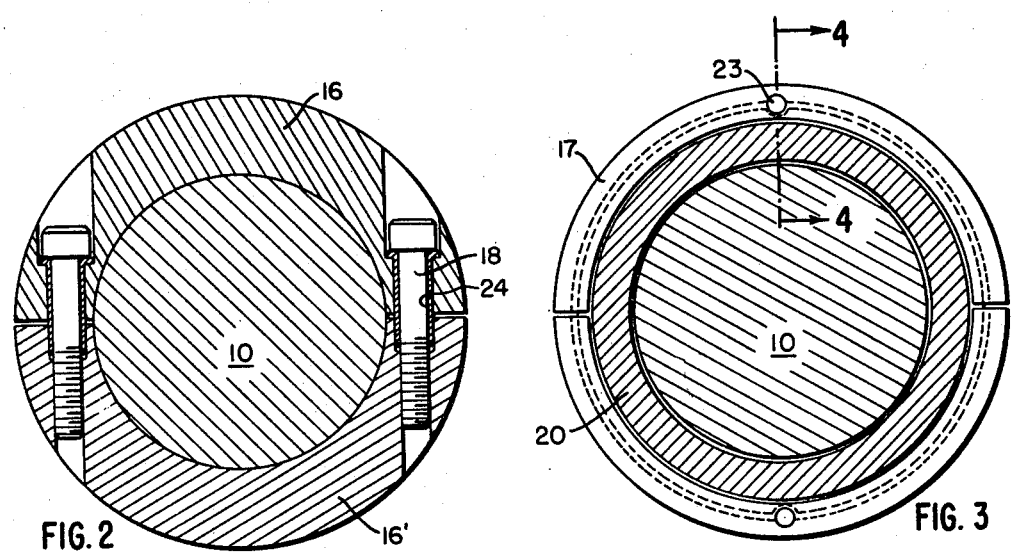
FIG. 2 is a complete cross sectional view on the line 2—2 of FIG. 1.
FIG. 3 is a similar cross sectional view on the line 3—3 of FIG. 1.
Figure 4:
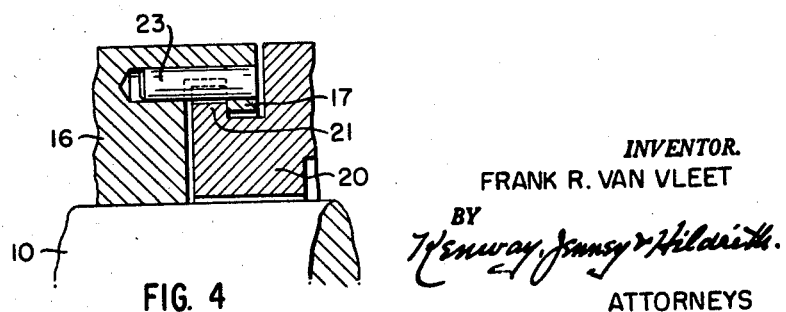
FIG. 4 is a fragmentary longitudinal section on an angle different from that of FIG. 1.

The shaft 10 is arranged to rotate within a stationary external housing 14 which includes a stuffing box or gland 12 bored to form together an elongated fluid pressure chamber about the shaft. The rotating elements of the seal comprise a two-part clamping ring 16, 16', connected to an integral ring 20. The two parts 16, 16' of the rotary ring are complementary half rings or semicircular segments and these are turned and lapped to fit accurately upon the shaft when separated by thin shims and are bored to receive hollow dowels 24 by which the alignment of the two parts is positively insured and maintained. Clamping bolts, seated in the half ring 16, pass through the dowels and are threaded into the half ring 16'. When the shims are removed the ring may be securely clamped upon the shaft without any distorting tendency whatever. As herein shown the right hand end of the clamping ring is recessed and provided with an inturned annular flange 17.

The integral ring 20 is bored to fit the shaft 10 with slight clearance and grooved in its inner face to contain an O-ring 22. Its left hand end is shouldered and provided with a portion of reduced diameter fitting within the recess in the inner face of the two-part ring and having also an out-turned flange 21 arranged to interlock with the flange 17 of the clamping ring. The two flanges are bored at diametrically opposite points to receive locking pins 23 that hold the rings together so that they rotate as one with the shaft 10. The right hand radial end face C of the integral ring 20 is accurately squared and lapped to form one contact or sealing face of the seal. In assembling these parts the integral ring 20 with its O-ring 22 is first slipped on the shaft, then the half rings 16 and 16' are fitted upon it with the connecting pins 23 and finally the clamping bolts 18 are turned home. The result is that the integral ring 20 is accurately secured to the shaft in a condition free of internal stress and without any tendency to distort its sealing face.

The non-rotating elements of the seal include a floating piston or adaptor 26 having an annular forwardly projecting rim and shown as being urged toward the left by compression springs 27 contained in sockets formed in the stationary body of the gland 12 and spaced about the back of the piston.

An elongated sleeve 28 movable on the shaft is recessed and flanged at its left hand end to receive and hold a ring 29, also recessed and flanged to present a radial end surface accurately squared and lapped to form the cooperating non-rotary contact face of the seal with the ring 29 in the area C.

The housing gland 12 is recessed to receive and hold a drag absorbing disk 30 having a hollow or tubular stem 31, extending toward the right and surrounding with clearance the body of the sleeve 28. The body of the disk 30 is bored at several points to provide fluid passages 32, one of which is shown in FIG. 1, and the inner wall of the disk is grooved to receive an O-ring 33 which makes a seal between the disk 30 and the sleeve 28.

An annular passage is formed between the inner wall of the gland 12 and the outer cylindrical wall of the stem 31 and in this passage is placed a dynamic O-ring 34 which is in contact with the rim of the piston 26 and moved thereby when the piston is advanced by the springs 27 against decreasing fluid pressure in the chamber.

Dynamic O-ring 34, disk 30 with stem 31, and fixed O-ring 33 thus cooperate in a novel manner to provide dynamic sealing means in the axial passage between the inner wall of the gland 12 and the outer cylindrical wall of the sleeve 28.

As explained in my copending application Serial No. 845,271 filed October 8, 1959, Patent No. 3,068,012, it is important to relieve the contact faces of all spring pressure during the normal running of the shaft so that the contact faces at C shall be engaged only by balanced fluid pressure. Accordingly as the fluid pressure builds up, the piston 26 is retracted until it butts up against the solid wall of the gland as shown in FIG. 1 and the effective pressure of the springs 27 is eliminated from the contact faces at C while the space A is opened. As the pressure drops the piston is advanced by the springs, closing the space A and the dynamic O-ring 34 is moved toward the left but without imparting any drag to the sleeve 28 or pressure to the contact faces at C. This is prevented by the stem 31 that is interposed between the sleeve 28 and the O-ring as already explained.

The area of the O-ring 34 upon which pressure is effective in moving the piston 26 to the right or to its spring retracting position is greater than the area B of the sleeve 28 upon which the pressure is effective in moving the sleeve to the left.

Fluid pressure within the chamber, in the absence of effective pressure by the springs 27, is balanced by pressure in the area B so that the contact surfaces at C are engaged with light pressure permitting a film of oil to lubricate them under running conditions and so reducing wear to a minimum.

When the fluid pressure builds up in the chamber it acts through the O-ring 34 against the rim of the piston to force the piston 12 toward the right until it is arrested in the position shown in FIG. 1.

Having thus disclosed my invention and described in detail an illustrative embodiment thereof, I claim as new and desire to secure by Letters Patent:

1. In a fluid pressure rotary shaft seal for an axial passage between a shaft and the housing in which said shaft rotates, said seal having primary sealing means including an axially movable sealing surface, an axially movable sleeve arranged in spaced concentric relation with said shaft and operable to determine the axial position of said surface, said sleeve axially operable under conditions of normal fluid pressure in said passage by means of said fluid pressure, said sleeve axially operable under conditions of abnormally low fluid pressure in said passage by means of a piston located adjacent an end of said sleeve and powered by resilient means, said piston under conditions of normal fluid pressure kept spaced from said sleeve end by the force of said fluid pressure counteracting said resilient means; secondary dynamic sealing means located between said piston and said surface and providing a seal in the portion of said axial passage lying between said sleeve and said housing, said dynamic sealing means comprising annular axially stationary drag absorbing means disposed between said sleeve and said housing and spaced from said sleeve, said drag absorbing means including a cylindrical surface extending axially in the direction of said piston, and fluid pressure transmitting means, means sealingly fixed to said drag absorbing means and sealingly but slidingly contacting said sleeve, and an axially movable O-ring disposed between and in sealing contact with said housing and said cylindrical surface, said movable O-ring engaging said piston and adapted to move axially along said cylindrical surface relative to said sleeve without imparting drag to said sleeve.

2. In a fluid pressure rotary shaft seal for an axial passage between a shaft and the housing in which said shaft rotates, said seal having primary sealing means including an axially movable sealing surface, an axially movable sleeve arranged in spaced concentric relation with said shaft and operable to determine the axial position of said surface, said sleeve axially operable under conditions of normal fluid pressure in said passage by means of said fluid pressure, said sleeve axially operable under conditions of abnormally low fluid pressure in said passage by means of a piston located adjacent an end of said sleeve and powered by resilient means, said piston under conditions of normal fluid pressure kept spaced from said sleeve end by the force of said fluid pressure counteracting said resilient means; secondary dynamic sealing means located between said piston and said surface and providing a seal in the portion of said axial passage lying between said sleeve and said housing, said dynamic sealing means comprising annular axially stationary drag absorbing means disposed between said sleeve and said housing and spaced from said sleeve, said drag absorbing means including a disk portion secured to said housing and an annular stem portion extending from said disk portion in the direction of said piston, said disk portion having at least one through axial passageway radially outward of said stem portion, means sealingly fixed to said drag absorbing means and sealingly but slidingly contacting said sleeve, and an axially movable O-ring disposed between and in sealing contact with housing and said stem portion, said movable O-ring engaging said piston and adapted to move axially relative to said sleeve without imparting drag thereto.

3. The apparatus of claim 1 wherein said drag absorbing means includes an annular groove in its surface opposite said sleeve and said fixed sealing means comprises an O-ring disposed in said groove.

4. The apparatus of claim 2 wherein said piston includes an annular rim projecting in the direction of said disk portion and having an inside diameter larger than the outside diameter of said stem portion, said rim, when said piston is spaced from said sleeve and under normal pressure conditions, projecting sufficiently far in the direction of said disk portion to contact said O-ring, said rim sufficiently short so that when said piston is in its position farthest in the direction of said disk portion said O-ring remains spaced from said disk portion.

5. Means for sealing an annular axial fluid passage between concentrically arranged members, at least one of which is an axially movable sleeve, comprising axially stationary annular drag absorbing means disposed in said passage and spaced from said one member, said drag absorbing means including an axially extending cylindrical surface, means sealingly fixed to said drag absorbing means and sealingly but slidingly contacting said one member, and an axially movable O-ring disposed between and in sealing contact with said other member and said cylindrical surface, said O-ring thereby adapted to move axially along said cylindrical surface relative to said one member without imparting drag thereto.

6. The apparatus of claim 5 wherein said drag absorbing means includes an annular groove in its surface opposite said sleeve and said fixed sealing means comprises an O-ring disposed in said groove.

7. Means for sealing an annular axial fluid passage between concentrically arranged members, at least one of which is axially movable, comprising axially stationary annular drag absorbing means disposed in said passage and spaced from said one member, said drag absorbing means including a disk portion secured to said other member and an annular stem portion extending from said disk portion, said disk portion having at least one through axial passageway radially outward of said stem portion, means sealingly fixed to said drag absorbing means and sealing but slidingly contacting said one member, and an axially movable O-ring disposed between and in sealing contact with said other member and said stem portion, said O-ring thereby adapted to move axially relative to said one member without imparting drag thereto.

References Cited by the Examiner

UNITED STATES PATENTS

| | | | |
|---|---|---|---|
| 2,503,086 | 4/50 | Albright | 277—87 |
| 2,887,332 | 5/59 | Lazar | 277—83 |
| 2,930,636 | 3/60 | Tracy | 277—27 |
| 2,974,982 | 3/61 | Luenberger | 277—83 |
| 2,996,319 | 8/61 | Copes | 277—87 |
| 2,999,702 | 9/61 | Dunn et al. | 277—83 X |
| 3,068,012 | 12/62 | Van Vleet | 277—27 |

EDWARD V. BENHAM, *Primary Examiner.*

SAMUEL ROTHBERG, *Examiner.*